(12) United States Patent
Deml

(10) Patent No.: US 7,712,836 B2
(45) Date of Patent: May 11, 2010

(54) VEHICLE SEAT COMPRISING A HEIGHT-ADJUSTABLE SEAT FRAME

(75) Inventor: Johann Deml, Thanstein (DE)

(73) Assignee: Grammer AG, Amberg (DE)

( * ) Notice: Subject to any disclaimer, the term of this patent is extended or adjusted under 35 U.S.C. 154(b) by 40 days.

(21) Appl. No.: 11/735,239

(22) Filed: Apr. 13, 2007

(65) Prior Publication Data
US 2008/0088165 A1    Apr. 17, 2008

(30) Foreign Application Priority Data
Apr. 15, 2006    (DE)    ........................ 10 2006 017 774

(51) Int. Cl.
*A47C 1/00*    (2006.01)
(52) U.S. Cl. ............................. 297/344.16; 297/344.12
(58) Field of Classification Search ............ 297/344.12, 297/344.15, 344.16
See application file for complete search history.

(56) References Cited

U.S. PATENT DOCUMENTS

| 4,286,765 | A | * | 9/1981 | Delgleize et al. ............ 248/573 |
| 4,645,169 | A |   | 2/1987 | Mischer |
| 4,729,539 | A | * | 3/1988 | Nagata ........................ 248/575 |
| 4,822,094 | A | * | 4/1989 | Oldfather et al. ......... 296/65.02 |
| 4,946,145 | A | * | 8/1990 | Kurabe ....................... 267/131 |
| 5,125,631 | A |   | 6/1992 | Brodersen et al. |
| 5,176,355 | A | * | 1/1993 | Carter ........................ 248/550 |
| 5,533,703 | A | * | 7/1996 | Grassl et al. ................. 248/550 |
| 5,735,509 | A |   | 4/1998 | Gryp et al. |
| 6,371,456 | B1 | * | 4/2002 | Ritchie et al. ............ 267/64.12 |
| 6,616,116 | B1 | * | 9/2003 | Rochau et al. .............. 248/564 |

FOREIGN PATENT DOCUMENTS

| KR | 20020090377 | 12/2002 |
| WO | 0058125 | 10/2000 |
| WO | WO2005102112 | 3/2005 |

* cited by examiner

*Primary Examiner*—Sarah B McPartlin
(74) *Attorney, Agent, or Firm*—Black Lowe & Graham PLLC

(57)    ABSTRACT

A vehicle seat includes a height-adjustable seat frame which has at least two seat frame parts which can be moved relative to one another and at least one gas spring arranged between the seat frame parts for height adjustment purposes. The seat includes a control device that acts upon the gas spring and includes a valve device attached to a first seat frame part and has control valves for actuating gas flows for the gas spring. A control link on a second frame part actuates the control valves, so that a predefinable height of the vehicle seat is ensured regardless of a weight load on the vehicle seat. Movement of the control link relative to the second seat frame part brings about a height adjustment of the vehicle seat.

17 Claims, 8 Drawing Sheets

VEHICLE SEAT COMPRISING A HEIGHT-ADJUSTABLE SEAT FRAME

PRIORITY CLAIM

This application claims priority to German Application No. 10 2006 017 774.6 filed Apr. 15, 2006.

BACKGROUND OF THE INVENTION

It is known from DE 43 35 199 C1 to provide a sprung vehicle seat with a scissors-type frame which has scissor elements that can be pivoted about a common scissor axle. To adjust the scissors-type frame, a gas spring is provided, by means of which a first valve device for adjusting the height of the driver's seat and a second valve device for adjusting the height of the driver's seat as a function of weight can be connected via a coupling. The coupling comprises a segment element which can pivot about the scissor axle and has an arc-shaped toothed section, and a pivot arm with a toothing which can be brought into meshing engagement with the toothed section. The pivot arm is connected to one of the scissor elements and can be actuated by means of a drive device which is connected to the first valve device. Furthermore, a link element which serves to actuate the second valve device and which can be moved to a limited extent relative to the segment element is arranged in a pivotable manner on the scissor axle.

SUMMARY OF THE INVENTION

The invention relates to a vehicle seat comprising a height-adjustable seat frame which has at least two seat frame parts which can be moved relative to one another and at least one gas spring arranged between the seat frame parts for height adjustment purposes, comprising at least one control device which is provided for acting upon the gas spring and which comprises at least one valve device attached to a first seat frame part and having control valves for actuating gas flows for the gas spring, and a control link provided on a second seat frame part for actuating the control valves, so that a predefinable height of the vehicle seat is ensured regardless of a weight load on the vehicle seat.

The object of the invention is to provide a simplified height adjustment and a simplified weight-independent level control for a vehicle seat.

This object is achieved by a vehicle seat of the type mentioned in the introduction, in which the control link can be adjusted by relative movement with respect to the second seat frame part by means of an adjustment device, independently of a relative position between the seat frame parts, such that a movement of the control link relative to the second seat frame part which is brought about by the adjustment device brings about a height adjustment of the vehicle seat. A height adjustment of the vehicle seat can thus be implemented in a simple manner. The position of the control link relative to the second seat frame part can be changed by a user of the vehicle seat by means of the adjustment device, in particular an actuating lever, such that an actuation of the valve device is brought about which gives rise to a height adjustment corresponding to the change in position of the control link, which height adjustment may occur as a lowering or as a raising of the vehicle seat. As soon as the new height of the vehicle seat has been set by the gas spring, the control device again acts only as a level control so as to ensure a weight-independent height setting of the vehicle seat. From the point of view of the valve device, the change in position of the control link which can be brought about by means of the adjustment device is nothing other than a deviation from a neutral position which could also be brought about in the same way by a change in a weight influence on the vehicle seat. By using the same devices and the same mechanisms of action for the height adjustment and the level control, it is possible to implement a height adjustment for the vehicle seat which can be produced in a cost-effective manner.

In a further embodiment of the invention, it is provided that the control link is prestressed against an actuating force of the adjustment device by means of an energy-storing device. The energy-storing device, which may in particular be configured as a torsion spring, ensures that particularly simple actuation of the control link can be implemented by means of a flexible cable which can be laid almost freely on the vehicle seat as far as an actuating lever. Since, with such a cable, typically only tensile forces can be transmitted to the control link, a restoring device in the form of an energy store is advantageous, which stores the actuation energy introduced during an adjusting movement for the control link and can release it again during an adjusting movement in the opposite direction.

In one embodiment of the invention, it is provided that the control link is rotatably articulated on the seat frame part and is formed at least in some sections as a cam disc with at least two preferably parallel control paths. During a height adjustment of the vehicle seat, typically a relative movement, in particular a pivoting movement, takes place between two seat frame parts which can move relative to one another and which may be designed for example in the manner of a parallelogram guide or in the manner of a scissors-type frame. It is therefore advantageous to adapt the control link to be provided for the vehicle seat to the pivoting movement that is to take place, which can preferably be ensured by a configuration as a cam disc, that is to say a disc with a circular-segment-shaped outer contour at least in some sections. In order to perform the desired height adjustment of the vehicle seat, the cam disc is likewise actuated, which for this purpose is pivoted relative to the seat frame parts so as to give rise to a deviation from a neutral position with respect to the valve device and thus to bring about actuation of the valve device, which can then bring about a corresponding compressed air flow to or from the gas spring. The cam disc has at least two parallel control paths which at least partially revolve about a preferably common pivot axis, in particular in a concentric manner, said control paths being provided in the manner of control cams for actuating the valve device and thereby being able to ensure, when configured in a suitable manner, both the height adjustment of the vehicle seat and the weight-independent level control of the vehicle seat.

In a further embodiment of the invention, it is provided that the valve device comprises two control valves which are provided in particular with drag levers and can be actuated by the parallel control paths. The dual function of the cam disc can thus be implemented in a simple manner, since the same control paths are used for pressurizing or venting the gas spring, regardless of the task to be accomplished at any time, i.e. height adjustment or weight-independent level control. A first control valve is provided for blocking or enabling a compressed air flow made available by a pressure source, in particular a compressor. A second control valve is provided for venting the gas spring and thus permits lowering of the vehicle seat.

In a further embodiment of the invention, it is provided that the control paths of the control link are designed as arc-shaped circumference sections with different radii in some sections. Due to the configuration of the circular arc sections, which are preferably oriented concentrically with respect to a pivot axis of the control link, a clear control state for the respective control valve can be ensured, which is either completely closed or completely open. A transition between two circular arc sections of a control path preferably takes place by a ramp which is adapted to the geometry of the drag levers, in the smallest possible angular cutout between the circular arc sections, so as to ensure a rapid response of the control valves.

In a further embodiment of the invention, it is provided that the control paths of the control link have essentially the same radius at least in some sections. This allows a symmetrical structure of the valve device and ensures essentially the same response by the two control valves, which are assigned to the parallel control paths. In one particularly advantageous embodiment of the invention, it is provided that the control paths have an essentially identical, relatively large radius in a common angular section and merge with ramps which face away from one another in different circumferential directions on an essentially smaller radius. The angular range in which the two control paths have the same radius corresponds to the neutral position, in which both control valves are closed and no compressed air flow is passed to or from the gas spring. When the cam disc is pivoted out of the neutral position relative to the valve device, regardless of whether a position of the control link relative to the seat frame part has changed or whether the seat frame parts have moved relative to one another on account of a weight change, a drag lever of a control valve is guided along the ramp to the larger radius, as a result of which the drag lever is deflected out and the corresponding control valve is actuated, which in turn affects a compressed air flow from or to the gas spring.

In a further embodiment of the invention, it is provided that the control link comprises a roll-off surface running round it at least in some sections for the adjustment means designed as a flexible traction means, in particular as a cable. A roll-off surface, which in particular may be oriented concentrically or eccentrically with respect to a pivot axis of the control link or cam disc, allows a linear or non-linear movement conversion of a movement of the traction means. In the case of a concentrically oriented roll-off surface, a movement of the traction means is converted in a linear and proportional manner into a corresponding pivot angle of the control link. In the case of an eccentric roll-off surface, there is a non-linear relationship between a movement of the traction means and a pivot angle of the control link, as a result of which adaptation to special requirements of the control link can be implemented, in particular with regard to a response of the valve device.

In a further embodiment of the invention, it is provided that the control link is rotatably arranged on a center axle of a scissors-type frame. A scissors-type frame allows a compact and robust construction of a height-adjustable vehicle seat. The arrangement of the control link on the center axle of the scissors-type frame and the assignment of the valve device to at least one scissor arm of the scissors-type frame allows a particularly compact arrangement of the control device for the height adjustment and level control of the vehicle seat.

In a further embodiment of the invention, it is provided that the valve device is assigned a stop valve for enabling or blocking a communicating connection between the gas spring and the control valves. By means of the stop valve, a compressed air flow from or to the gas spring can be enabled or blocked. Automatic level control can take place in the enabled position, whereas in the blocked position no height adjustment or level control is provided and the gas spring acts as a closed suspension system with a gas cushion. Typically, the stop valve is brought into the blocked position when the user wishes to reduce the vibration behaviour of the vehicle seat, for example when travelling with a motor vehicle equipped with such a vehicle seat over an uneven surface, in particular a surface containing potholes, for example on a dirt track, in a field or on a construction site, where the suspension properties of the vehicle seat can be used with advantage.

In a further embodiment of the invention, it is provided that the stop valve has an additional venting position for rapid venting of the gas spring, which is provided for rapidly lowering the vehicle seat. When a user enters or leaves a motor vehicle equipped with the height-adjustable vehicle seat, a low height setting of the vehicle seat which can easily be entered or left can thus quickly be assumed. In the venting position, the venting of the gas spring is not slowed down by a throttle as may be provided in one of the control valves. Rather, the venting speed for the gas spring in the venting position of the stop valve is limited only by the cross sections of the compressed air line between the gas spring and the stop valve and by the cross section of the venting channel provided in the stop valve.

In a further embodiment of the invention, it is provided that the control link is designed to actuate an adjustable movement stop which is provided for limiting a vibration amplitude of the vehicle seat, in particular in active connection with at least one of the scissor arms. A position of a movement stop which is dependent on the height setting of the vehicle seat can be used to prevent the situation whereby the vehicle seat can carry out a vibration with a vibration amplitude that is unpleasant for the user, especially in particularly high positions. Rather, a vibration amplitude which is preferably essentially the same over the entire adjustment range of the vehicle seat can be implemented on account of the movement stop which can be adjusted as a function of the position of the control link. For this purpose, the control link may be provided with transmission means, in particular with a toothing, which makes it possible to transmit the pivoting movement to the adjustable movement stop.

BRIEF DESCRIPTION OF THE DRAWINGS

Further advantages and features will emerge from the claims and from the following description of a preferred example of embodiment which is given with reference to the schematic drawings, in which:

DETAILED DESCRIPTION OF THE PREFERRED EMBODIMENT

Figure 1:
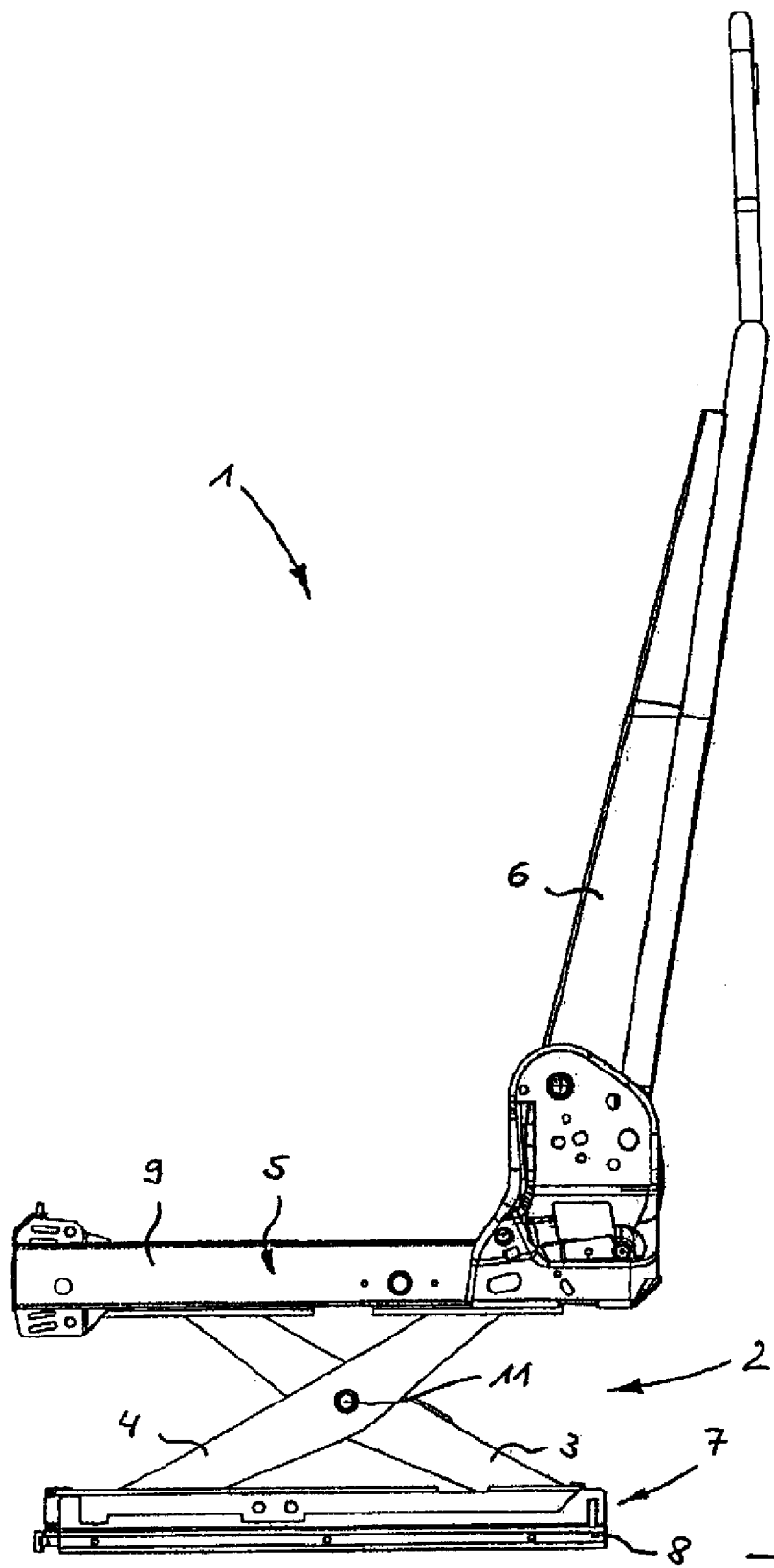
FIG. 1 shows a side view of a vehicle seat comprising a height-adjustable seat frame.

A vehicle seat 1 shown in FIG. 1 comprises a height-adjustable seat frame designed as a scissors-type frame 2, for height adjustment in the vertical direction, i.e. upwards or downwards in the plane of the drawing in FIG. 1, with a seat surface 5 and a backrest 6, wherein the scissors-type frame 2 is held on sliding rails 8 for longitudinal adjustment, i.e. to the left or to the right in the plane of the drawing.

Figure 2:
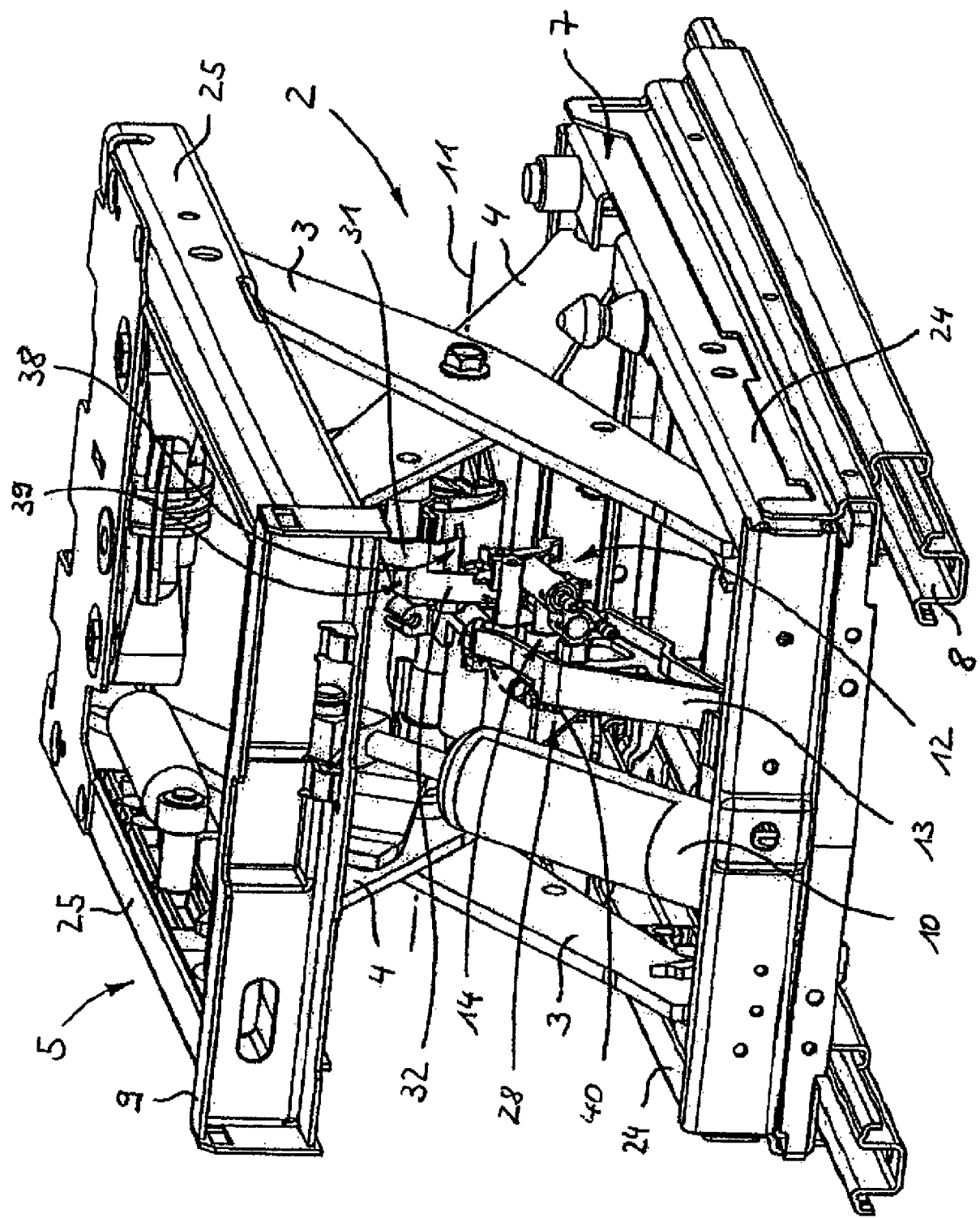
FIG. 2 shows a perspective diagram of the seat frame according to FIG. 1.
Figure 3:
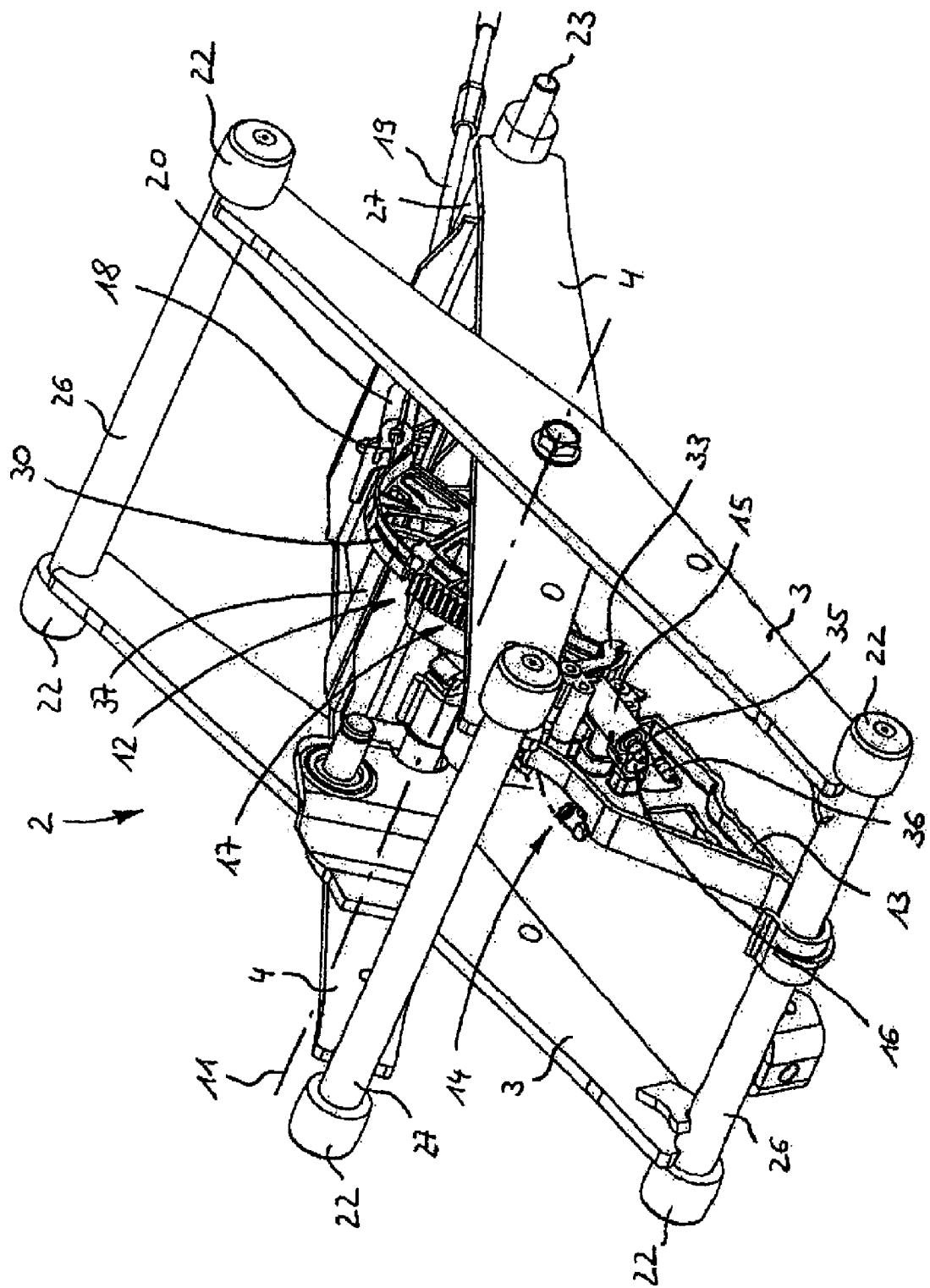
FIG. 3 shows a perspective diagram of an assembly of the seat frame according to FIGS. 1 and 2 which is provided for height adjustment purposes.
Figure 4:
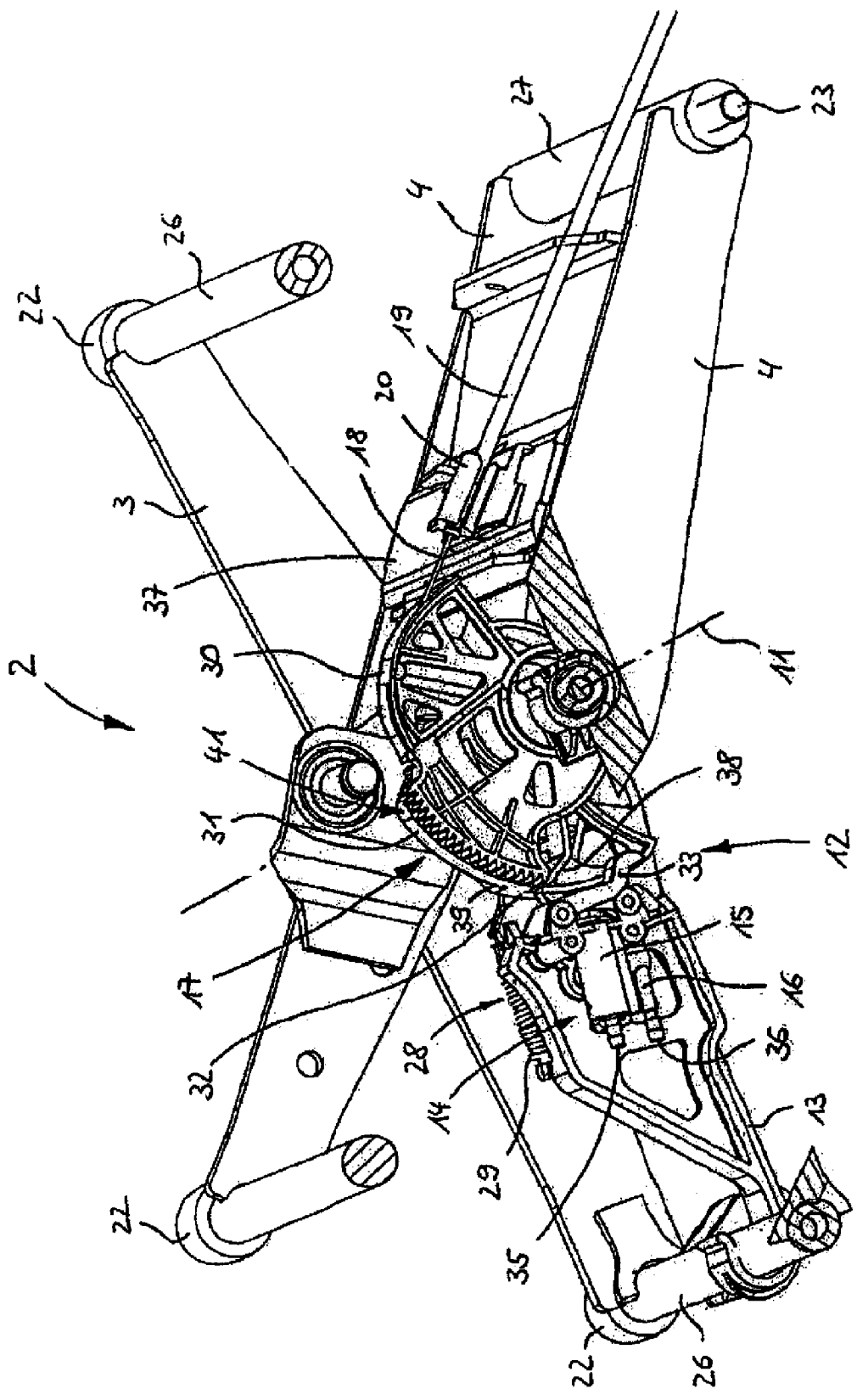
FIG. 4 shows a partially cut-away diagram of the assembly according to FIG. 3 with a height-adjustment device.

FIGS. 2 to 4 show the structure of the scissors-type frame 2 in more detail. The scissors-type frame 2 is formed of in each case two scissor arms 3, 4 oriented parallel to one another in pairs, these being arranged at a distance from one another and being pivotably connected to one another by means of a scissor axle 11. Rotatable rollers 22 which are fitted to the end of connecting rods 26 are provided on first scissor arms 3, which form first seat frame parts. Outwardly protruding hinge pins 23 for a pivotable, stationary hinge connection to a base frame 7 held displaceably in the sliding rails 8 are provided at first end regions of second scissor arms 4, which form second seat frame parts. Rollers 22 which are fitted on a connecting rod 27 are provided at second end regions of the second scissor arms 4, which rollers allow a translational movement even under a relatively high load, i.e. for example under the weight of a user of the vehicle seat 1, in the U-shaped, inwardly open running rails 25 of a seat surface frame 9. The rollers 22 of the first scissor arms 3 are likewise provided for a translational relative movement in the running rails 25 of the seat surface frame 9 and in the identically U-shaped, inwardly open running rails 23 of the base frame 7.

Provided between the first and second scissor arms 3, 4 is a length-adjustable gas spring 10 which allows a change in the angular position of the scissor arms 3, 4 and thus allows a setting of the distance between the base frame 7 and the seat surface frame 9, which results in a height adjustment of the seat surface 5 of the vehicle seat 1 with respect to the base frame 7 fixed to a vehicle floor (not shown).

For a weight-independent and vibration-damping suspension of the height-adjustable vehicle seat 1, a control device 12 is provided which is configured to change the length of the gas spring 10 and which comprises a valve device 14 assigned to the first seat frame part, i.e. the first scissor arms 3, and having control valves 15, 16 and also having a venting valve 28 for actuating gas flows for the gas spring 10 and also a control link designed as a cam disc 17 provided on the second seat frame part formed by the second scissor arms 4 for actuating the control valves 15, 16. The control valves 15, 16 and the venting valve 28 are attached to side faces of a carrier plate 13 which point away from one another, and are connected to one another such that they can communicate pneumatically. The mode of operation of the control valves 15, 16 and of the venting valve 28 will be explained below. The carrier plate 13 is provided with a hook at the end for attaching it to the connecting rod 26 and has, on an end region facing away from the hook, a U-shaped recess which is provided for a form-fitting connection with the scissor axle 11.

The cam disc 17 is pivotably held on the scissor axle 11 and is connected to a cable 18 designed as an adjustment means, which is coupled to an actuating lever (not shown) and allows a pivoting movement of the cam disc 17 counter to a restoring moment applied by a torsion spring (not shown) and acting about the scissor axle 11. As shown in greater detail in FIG. 3, the cable 18 is guided over a control surface 30 provided on the cam disc 17, which control surface allows a roll-off movement of the cable 18 during a pivoting movement of the cam disc 17. An outer sheath 19 of the cable 17 is supported on a support 20 on a transverse support 37 which connects the second scissor arms 4, and can thus be arranged in a freely selectable course from the support 20 to the actuating lever (not shown). The actuating lever and the cable 18 are adapted to the cam disc 17 and the associated torsion spring in such a way that an adjusting movement on the actuating lever leads to a pivoting movement of the cam disc 17, wherein the cam disc can assume the position defined by the actuating lever regardless of a relative position of the scissor arms 3, 4 and also maintains this position in the event of a relative movement of the scissor arms 3, 4 with respect to one another, without this leading to an undesirable movement of the cam disc 17. In particular, a pre-setting or pre-selection of a seat height, i.e. a height setting of the vehicle seat, can be performed even without any pneumatic pressure. The cam disc 17 has a mouth-like bearing surface 42 shaped in the manner of a C, which is pivotably mounted on a bearing region 43 of the carrier plate 13 which is cylindrical in some sections. The mouth width of the bearing surface 42 corresponds essentially to the diameter of the scissor axle 11, so that the cam disc 17 can be pushed onto the scissor axle 11 and can be mounted in active connection with the carrier plate 13 in a form-fitting manner on the scissor axle 11. Here, the carrier plate 13 is first mounted on the connecting rod 26 and the scissor axle 11. The cam disc 17 is then oriented in a mounting position, which differs from the control positions shown in FIGS. 6 to 8, pushed onto the bearing region 43 and then pivoted into one of the control positions, as a result of which the desired form-fitting locking on the scissor axle 11 can be brought about.

The control device 12 essentially formed by the valve device 14 and the cam disc 17 makes it possible to maintain a predefinable height for the vehicle seat 1 independently of any weight load on the vehicle seat 1. The control valves 15, 16 assigned to the valve device 14 are in each case provided with drag levers 33, 34 which can slide on control cams 31, 32 of the cam disc 17 and which are provided as switching valves for blocking or enabling a compressed air flow to or from the gas spring 10, wherein both control valves, without actuation by the respective drag lever 33, 34, assume a blocked position in which no compressed air flow takes place. The stop valve designed as a venting valve 28 which is also fitted on the carrier plate 13 is provided in order to enable or block a pneumatic connection between the control valves 15, 16, wherein a venting channel for the escape of compressed air from the gas pressure spring 10 is provided through the venting valve 28 in the blocked position, said venting channel being independent of the control valves 15, 16. Actuation of the venting valve 28 takes place by means of a cable (not shown) which is actively connected to an actuating lever (not shown). Assigned to the venting valve 28 is a tension spring 29 which opposes the tensile force exerted by the cable and keeps the venting valve 28 in an open position when the tensile forces are low. Provided on the venting valve 28 is a connector 40 for connecting a compressed air hose (not shown) connected to the gas spring.

The first control valve 15 is coupled to a compressed air source (not shown) at a connector 35 via a compressed air hose (not shown), and can thus enable a compressed air supply to the gas spring 10. Here, a deflection of the drag lever 33 which is brought about by the cam disc 17 leads to opening of the first control valve 15. As a result, compressed air can flow into the gas spring 10 and increases the internal pressure therein so as to bring about a length expansion of the gas spring 10, by virtue of which a movement of the seat surface frame 9 upwards in the vertical direction can be carried out. The second control valve 16 has a discharged air connector 36, to which a compressed air hose (not shown) is attached, said compressed air hose having a compressed air throttle (not shown) at an end remote from the control valve 16. By opening the second control valve 16, the compressed air can escape from the gas spring 10, wherein a pressure change in the internal pressure of the gas spring 10 and thus the rate at which the seat surface frame 9 is lowered in the vertical direction can be limited by the throttle.

Figure 5:
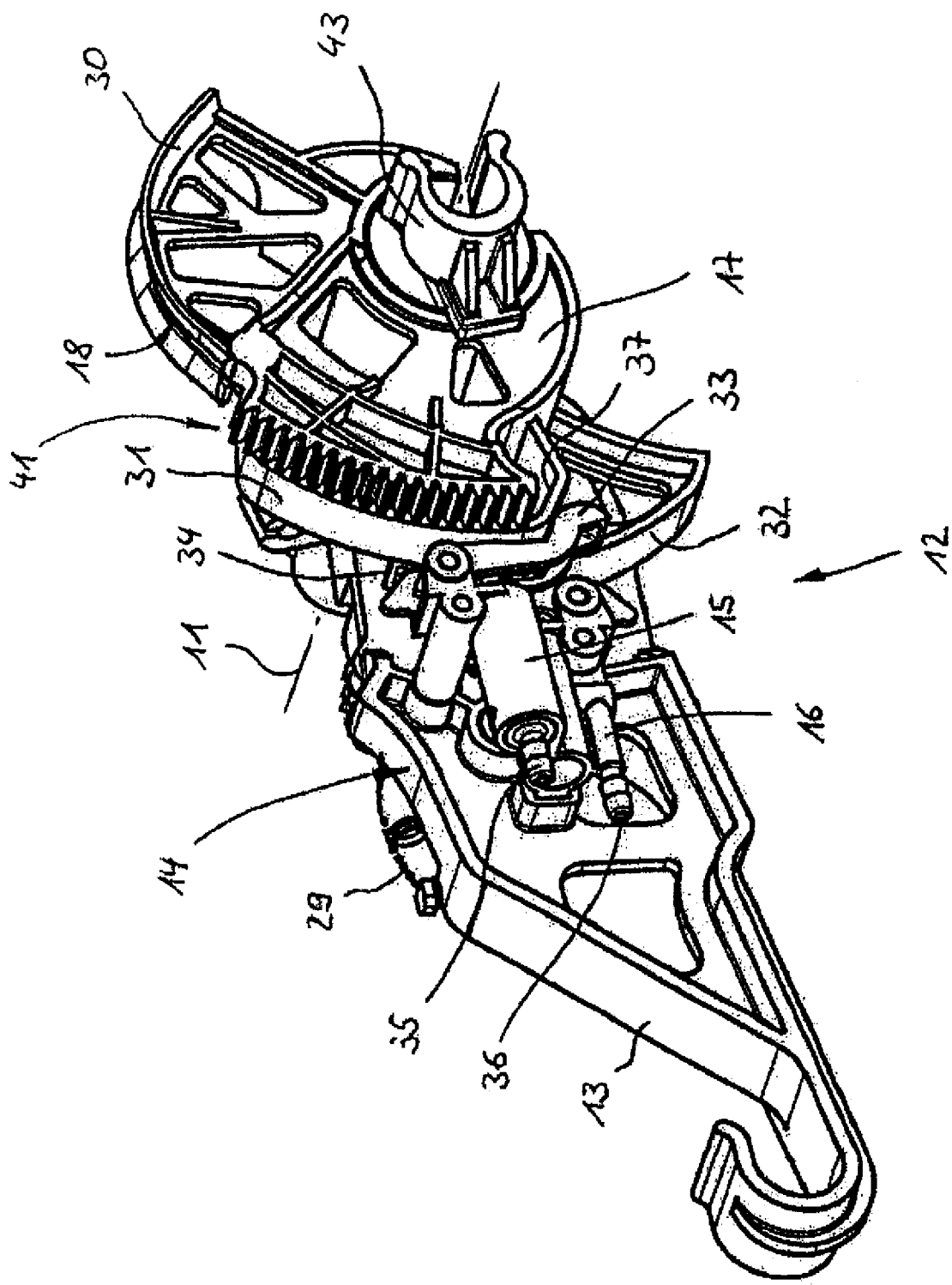
FIG. 5 shows a perspective diagram of the height-adjustment device according to FIG. 4.
Figure 7:
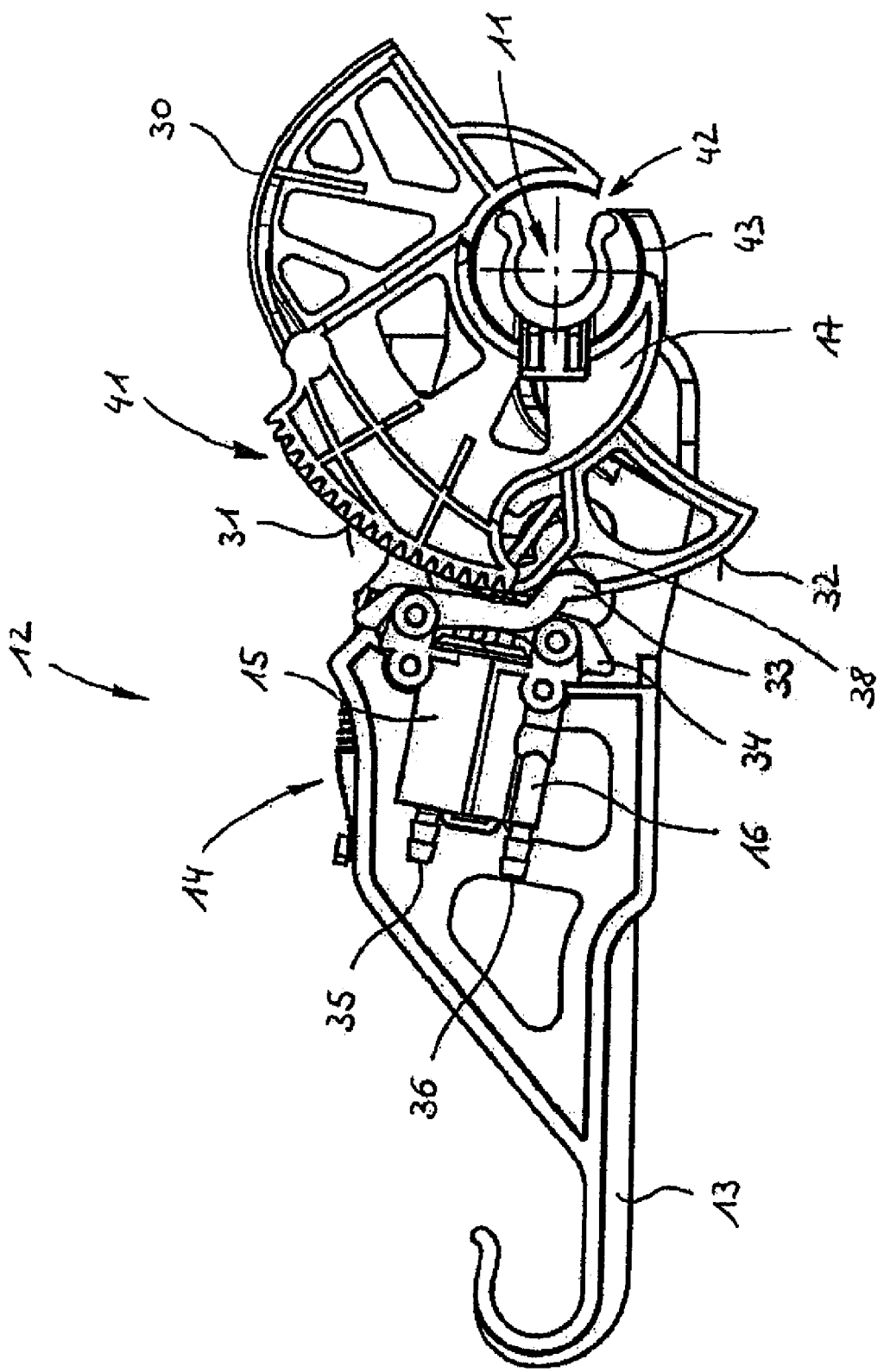
FIG. 7 shows the height-adjustment device according to FIG. 5 in a second control position.

The control cams 31, 32 on the circumference of the cam disc 17, which are arranged parallel next to one another, are configured with regard to their radius which changes over the circumference of the cam disc 17 in such a way that, in a second control position—a neutral position—shown in FIGS. 5 and 7, both control valves 15, 16 are closed and no pressure change in the gas spring 10 takes place. As soon as a relative movement between the cam disc 17 and the valve device 14 is brought about by actuating the cable 18 or by a change in the weight acting on the vehicle seat 1, the drag levers 33, 34 slide along the control cams 31, 32. Depending on the direction of the relative movement of the cam disc 17, this leads to a deflection of one of the drag levers 33, 34 and to an actuation of the corresponding control valve 15, 16. The actuation of the respective drag lever 33, 34 is brought about by a jump in radius of the respective control cam 31, 32, which is formed as an inclined surface 38, 39 on the control cams 31, 32 and allows the drag levers 33, 34 to slide off with little friction. The control cams 31, 32 and the drag levers 33, 34 attached to the control valves 15, 16 so as to pivot in different directions are adapted to one another in such a way that, in the neutral position shown in FIGS. 5 and 7, a pivoting movement by a pivot angle of less than 5 degrees can take place, within which there is no activation of any of the two control valves 15, 16. Due to the offset arrangement of the control valves 15, 16 and the opposite arrangement of the drag levers 33, 34, a particularly compact arrangement of the valve device and a likewise compact configuration of the cam disc 17 can be achieved.

Figure 6:
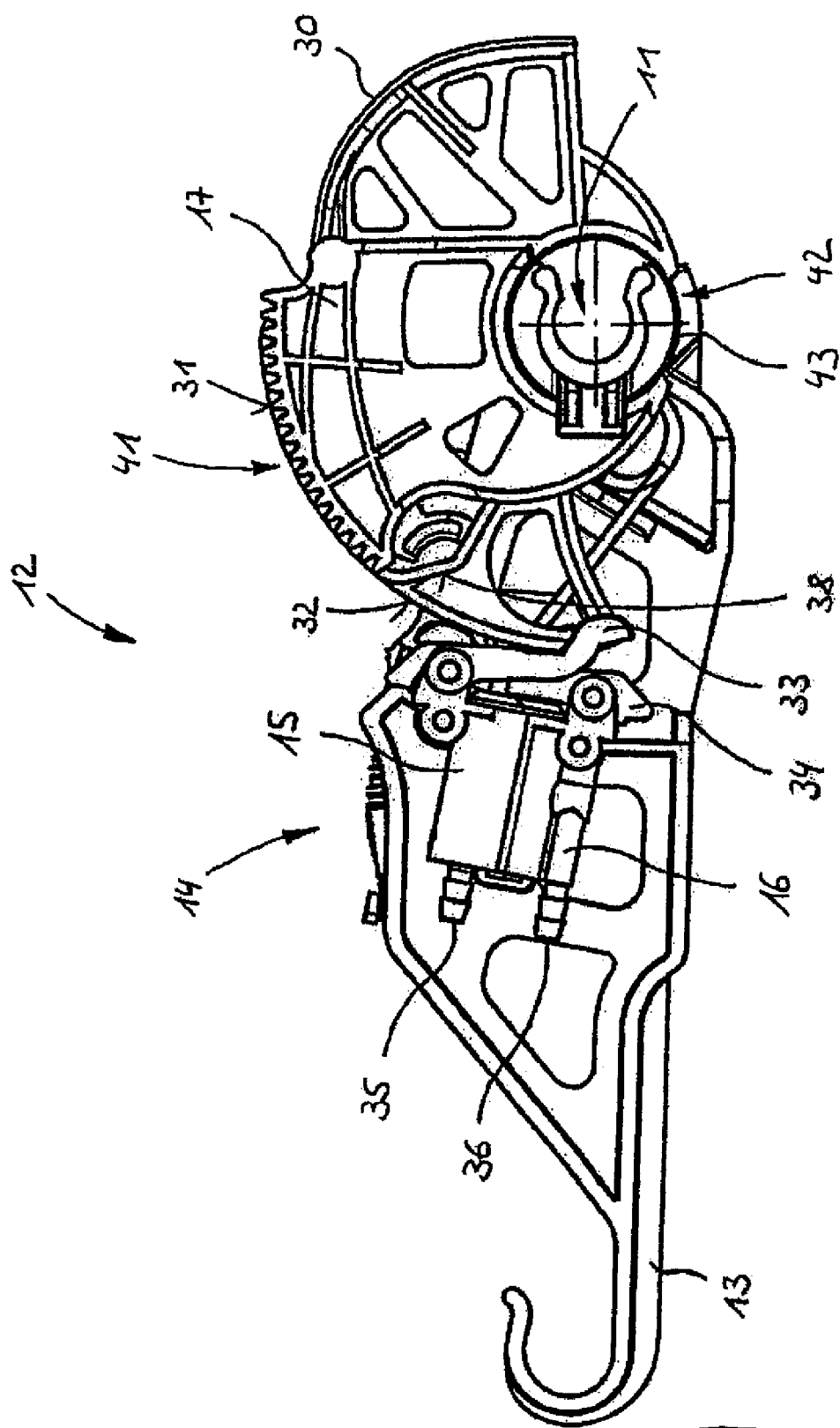
FIG. 6 shows the height-adjustment device according to FIG. 5 in a first control position.
Figure 8:
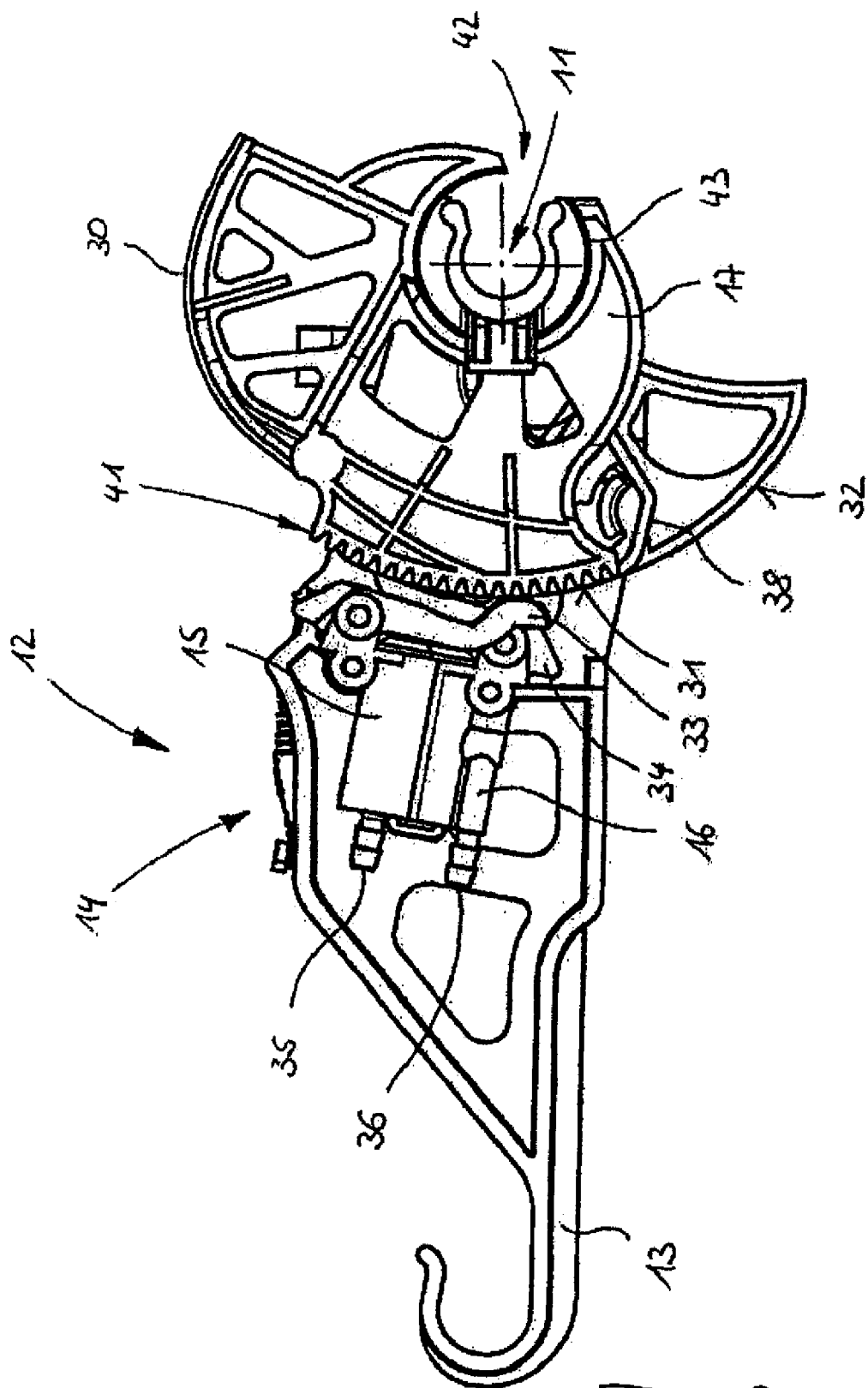
FIG. 8 shows the height-adjustment device according to FIG. 5 in a third control position.

By means of the above-described control device 12, the height-adjustable vehicle seat 1 implements an automatic and weight-independent height setting. The control device 12 is configured such that the gas spring 10 is actuated at any time such that the neutral position shown in FIGS. 5 and 7 for the control valves 15, 16 is ensured. If a pivoting movement of the cam disc 17 with respect to the valve device 14 and with respect to the second seat frame part is introduced from outside via the actuating lever which acts on the cable 18, so as to give rise to a change in height of the vehicle seat, then a deflection of one of the two drag levers 33, 34 is brought about on account of the relative movement of the cam disc 17. If the cam disc 17 is pivoted in such a way that an increase in the seat height of the vehicle seat 1 is desired, as shown in FIG. 8, then on account of the profile of the control cam 31 for the first control valve 15 this leads to actuation of the drag lever 33, as a result of which the first control valve 15 opens and allows compressed air to pass from the compressed air source to the gas spring 10, which gives rise to a change in length and therefore a resulting height adjustment in the upward direction for the vehicle seat 1 until the two scissor arms 3, 4 are pivoted so far that the cam disc 17 is in the neutral position with respect to the valve device 14. In the event of a pivoting movement of the cam disc in the opposite direction, as shown in FIG. 6, the drag lever 34 is deflected and opens the second control valve 16, so that compressed air can escape from the gas spring 10 via the throttle (not shown) assigned to the control valve 16 until the cam disc 17 and the valve device 14 are again in the neutral position shown in FIGS. 5 and 7, in which no compressed air flow into the gas pressure spring 10 takes place. An identical situation is obtained when the load on the vehicle seat 1 is removed, i.e. the user for example leaves the vehicle seat 1 in order to exit from the vehicle. Then a relative movement of the scissor arms 3, 4 takes place on account of the internal pressure within the gas spring 10, as a result of which the cam disc 17 is moved relative to the valve device 14 and the second control valve 16 is actuated in order to allow compressed air to escape from the gas spring 10 and thus bring about lowering of the vehicle seat 1 to the seat height predefined by the cam disc 17. When the load on the vehicle seat 1 is increased, the gas spring 10 is firstly compressed, as a result of which the first control valve 15 is actuated on account of the relative movement of the scissor arms 3, 4 and the cam disc 17 and can bring about an increase in the internal pressure of the gas spring 10 until the neutral position is assumed.

The above-described adjustment processes require that the venting valve 28 is in the open position. Only in the open position is there a communicating pneumatic connection between the gas spring 10 and the control valves 15, 16. The venting valve 28 can also be moved into a blocked position, in which no gas flow to or from the gas spring 10 can take place. In this blocked position, a level control is suppressed and the vehicle seat 1 is sprung only by the gas cushion enclosed in the gas spring 10. Weight adaptation likewise does not take place in the blocked position. The venting valve 28 can moreover assume a venting position, in which the internal pressure can escape from the gas spring 10 directly and unthrottled into the surroundings, without coming into contact with the control valves 15, 16. In the venting position, the communicating pneumatic connection between the control valves 15, 16 and the gas spring 10 is interrupted. Instead, the venting valve 28 opens up a suitable venting channel which allows the internal pressure to escape. The vehicle seat 1 can thus be lowered quickly in order for example to facilitate the entry or exit of a user. As soon as the user has sat on the vehicle seat, by actuating the actuating lever connected to the venting valve 28 he can end the direct venting of the gas spring 10 and re-establish the communicating pneumatic connection between the gas spring 10 and the control valves 15, 16. As a result, compressed air can flow into the gas spring 10 until the valve device 14 has assumed the neutral position with respect to the adjustable cam disc 17.

As shown in FIGS. 3 to 8, the cam disc 17 has a toothing on its end which is provided for a meshing active connection with a toothed wheel (not shown in any detail). The toothed wheel is rotatably held on a bearing journal which is attached to the second scissor arm 4. Connected to the toothed wheel is a height stop which is likewise rotatably held on the bearing journal eccentrically to a rotation axis of the toothed wheel and which can implement a deflection limitation for a weight-dependent level compensating movement of the vehicle seat 1 as a function of the pivot position of the cam disc 17 with respect to the second pivot arm. It is thus possible to delimit a movement range for the vehicle seat 1 as a function of the selected height setting, in order to prevent excessive vibration of the vehicle seat 1 particularly at high seat positions.

All the features disclosed in the application documents are claimed as essential to the invention in so far as they are novel individually or in combination with respect to the prior art.

What is claimed is:

1. A vehicle seat comprising:
   a height-adjustable seat frame comprising at least two seat frame parts which can be moved relative to one another and at least one gas spring arranged between the seat frame parts for height adjustment purposes;
   at least one control device for acting upon the gas spring, the control device comprises at least one valve device attached to the first seat frame part and having control valves for actuating gas flows for the gas spring, and a control link provided on a second seat frame part for actuating the control valves, so that a predefinable height of the vehicle seat is ensured regardless of a weight load on the vehicle seat; and an adjustment device for adjusting the control link by relative movement with respect to the second seat frame part independently of a relative position between the seat frame parts, movement of the control link relative to the second seat frame part causes a height adjustment of the vehicle seat,
wherein the control link is rotatably arranged solely on a center axle of a scissors-type frame, the scissors-type frame have at least two scissor arms.

2. The vehicle seat according to claim 1, wherein the adjustment device comprises an energy-storing device for producing an actuating force that prestresses the control link.

3. The vehicle seat according to claim 2, wherein the energy-storing device is a torsion spring.

4. The vehicle seat according to claim 1, wherein the control link is rotatably articulated on one of the seat frame parts and is formed at least in some sections as a cam disc with at least two parallel control paths.

5. The vehicle seat according to claim 4, wherein the valve device comprises two control valves comprising drag levers actuated by the parallel control paths.

6. The vehicle seat according to claim 4, wherein the control paths of the control link are arc-shaped circumference sections with different radii in at least some sections.

7. The vehicle seat according to claim 4, wherein the control paths of the control link have essentially the same radius at least in some sections.

8. The vehicle seat according to claim 1, wherein the control link comprises a roll-off surface running around at least in some sections of the control link, and the adjustment device is a flexible traction means.

9. The vehicle seat according to claim 8, wherein the flexible traction means is a cable.

10. The vehicle seat according to claim 1, wherein the valve device includes a stop valve for enabling or blocking a communicating connection between the gas spring and the control valves.

11. The vehicle seat according to claim 10, wherein the stop valve has an additional venting position for rapid venting of the gas spring, which is provided for rapidly lowering the vehicle seat.

12. The vehicle seat according to claim 1, wherein the control link comprises an adjustable movement stop for limiting a vibration amplitude of the vehicle seat.

13. The vehicle seat according to claim 12, wherein the adjustable movement stop is in active connection with at least one of the scissor arms.

14. A vehicle seat comprising:
a height-adjustable seat frame comprising at least two seat frame parts which can be moved relative to one another and at least one gas spring arranged between the seat frame parts for height adjustment purposes; and
at least one control device for acting upon the gas spring, the control device comprises:
at least one valve device attached to the first seat frame part and having control valves for actuating gas flows for the gas spring; and
a control link provided on a second seat frame part for actuating the control valves, so that a predefinable height of the vehicle seat is ensured regardless of a weight load on the vehicle seat; and
an adjustment device for adjusting the control link by relative movement with respect to the second seat frame part independently of a relative position between the seat frame parts, movement of the control link relative to the second seat frame part causes a height adjustment of the vehicle seat,
wherein the control link is rotatably arranged solely on a center axle of a scissors-type frame, the scissors-type frame have at least two scissor arms,
wherein the control link is rotatably articulated on one of the seat frame parts and is formed at least in some sections as a cam disc with at least two parallel control paths.

15. The vehicle seat according to claim 14, wherein the control valves comprise one or more drag levers actuated by respective ones of the parallel control paths.

16. A vehicle seat comprising:
a height-adjustable seat frame comprising at least two seat frame parts which can be moved relative to one another and at least one gas spring arranged between the seat frame parts for height adjustment purposes; and
at least one control device for acting upon the gas spring, the control device comprises:
at least one valve device attached to the first seat frame part and having control valves for actuating gas flows for the gas spring; and
at least one drag lever associated with the at least one valve device; and
a control link provided on a second seat frame part for actuating the control valves by adjusting position of an associated one of the at least one drag lever, so that a predefinable height of the vehicle seat is ensured regardless of a weight load on the vehicle seat; and
an adjustment device for adjusting the control link by relative movement with respect to the second seat frame part independently of a relative position between the seat frame parts, movement of the control link relative to the second seat frame part causes a height adjustment of the vehicle seat,
wherein the control link is rotatably arranged solely on a center axle of a scissors-type frame, the scissors-type frame have at least two scissor arms,
wherein the control link is formed at least in some sections as a cam disc with control paths having arc-shaped circumference sections with different radii in at least some sections,
wherein the at least one drag lever comprises a plurality of levers, each lever maintains contact with a respective one of the arc-shaped circumference sections.

17. The vehicle seat according to claim 16, wherein the control paths of the control link have essentially the same radius at least in some sections.

* * * * *